United States Patent [19]
Perreault

[11] Patent Number: 5,937,564
[45] Date of Patent: Aug. 17, 1999

[54] GAME FISH LANDING SEAT ASSEMBLY

[76] Inventor: Albert W. Perreault, HC 67 Box 4, Dingman's Ferry, Pa. 18328

[21] Appl. No.: 08/700,197

[22] Filed: Aug. 20, 1996

[51] Int. Cl.$^6$ .................................................. A01K 97/10
[52] U.S. Cl. .............................................. 43/4.5; 43/21.2
[58] Field of Search .................... 43/4.5, 21.2; 114/363; 297/188.01

[56] References Cited

U.S. PATENT DOCUMENTS

| | | | |
|---|---|---|---|
| 3,151,910 | 10/1964 | Larson . | |
| 3,851,916 | 12/1974 | Quartullo | 43/21.2 X |
| 4,043,070 | 8/1977 | Lamothe | 43/21.2 |
| 4,086,676 | 5/1978 | Arruza | 114/363 |
| 4,581,840 | 4/1986 | Guith, II | 43/21.2 |
| 4,589,366 | 5/1986 | Eiber | 114/363 |
| 4,803,945 | 2/1989 | Adams et al. | 114/363 |
| 4,858,364 | 8/1989 | Butts | 43/21.2 |
| 4,879,963 | 11/1989 | Dionne | 43/21.2 X |
| 4,979,458 | 12/1990 | Bouza | 114/363 |
| 5,065,540 | 11/1991 | Potter, Jr. | 43/21.2 |
| 5,127,181 | 7/1992 | Tiexeira | 43/21.2 |

*Primary Examiner*—Robert P. Swiatek
*Attorney, Agent, or Firm*—Charles A. Wilkinson

[57] ABSTRACT

A fishing seat assembly includes a pivoted arm journaled on a pivot at the top of a rotatable post on a pedestal mounted on the after deck of a sport fishing boat. A seat is supported on one end of the pivot arm and a rod holder is attached to the arm close to the pivot point and preferably under the pivot point. A fisherman sits on the seat, and by controlling the weight on the seat with his legs, controls the relative height of the seat and therefore the altitude of the fishing pole, enabling the fisherman to move a fish closer to the boat by placing more weight on the seat and, while relieving weight from the seat, reel in excess line while moving the pole in a downward arc.

33 Claims, 6 Drawing Sheets

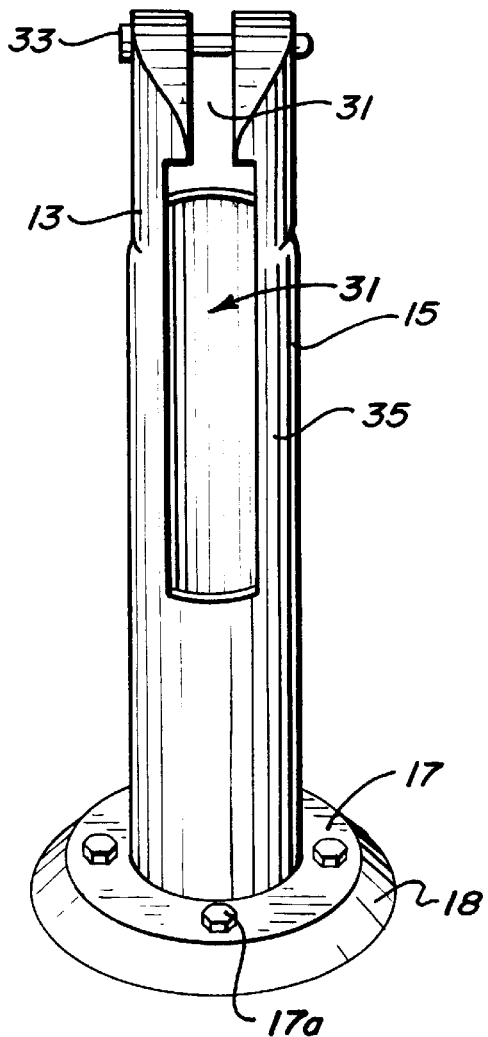
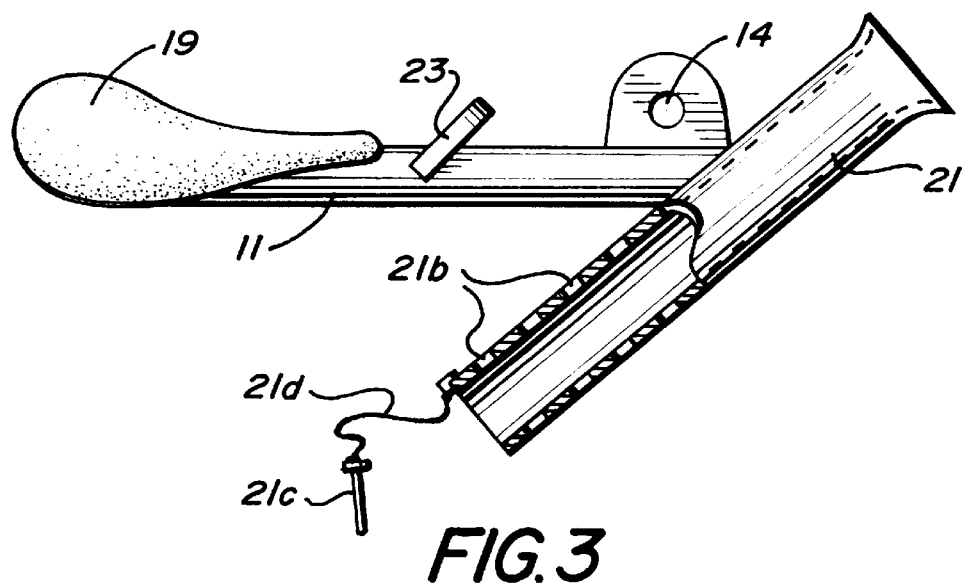

GAME FISH LANDING SEAT ASSEMBLY

BACKGROUND OF THE INVENTION

1. Field of the Invention

This invention relates to sport fishing and, more particularly, to an improved fishing seat for use on sport fishing boats. More particularly still this invention relates to a coordinated fishing pole holder and seat assembly for facilitating so-called "pumping," or back-and-forth movement, of a fishing pole to draw game fish close to a boat in a fatigued state in order, ultimately, to facilitate landing of such fish.

2. Description of the Prior Art

In fishing for so-called game fish such as for example, swordfish in temperate as well as tropical waters, marlin and sailfish, typically in tropical and semi-tropical waters, and tuna in both tropical and northern waters, as well as other large fish, it is customary for the fisherman to be seated in a so-called fishing or fighting chair at the stern of a deep-water fishing boat. Such chair is designed to provide a secure, stable seat to aid the fisherman in drawing a hooked fish into the vicinity of the boat where such fish can be dispatched and then landed or brought into the boat in either an exhausted or expired condition, in which state the fish is unlikely to do any serious damage to the boat or crew by thrashing about.

A large game fish can exert a considerable back pull against a hook in its mouth by back paddling as well as swimming transversely of the fishing line extending between the fisherman's fishing rod and the fish. Fishing rods, in general, have been developed to provide leverage with respect to both casting of the line away from shore or from a boat and also in setting the hook in the mouth of the fish. While these functions could be carried out using nothing but the leverage provided by the forearm of the fisherman, it has been found convenient when fishing, both from the shore and from the deck of a boat, to increase the available leverage by use of a pole which essentially serves as an extension of the forearm of the fisherman. Such extension essentially increases the available leverage with respect to the rapidity of movement at the end of the pole, thus increasing the extent of movement available with a small quick movement of the arms and wrists of the fisherman and, therefore, the quickness and extent of movement available at the hook end of the line. Such increased quickness and extent or scope of overall movement of the line with relatively small movements of the hands and arms of the fisherman considerably increases the control the fisherman is enabled to exert upon the line and its attached lure as well as upon a hooked fish. In fact, with considerable line in the water, inherent slack in the line may make the use of a pole a necessity in order to attain sufficient scope of movement of the line to enable the fisherman to make any quick adjustments of the hook and/or of the line at all, since a considerable part of the movement applied to the line by the fisherman is expended in taking up slack in the line. Such inherent slack may be either vertical slack caused by gravity acting upon the line resulting in intermediate sinking of the line and creating a downwardly curved arc between the pole and the lure at the end of the line and/or horizontal slack caused by transverse swimming of the fish or extraneous transverse currents. Actual stretching of the line caused by resilience of the line may also play a part in producing slack in the line. As a result, any movement by the fisherman at the pole end of the line is partially dissipated in first taking up part of the slack so that a large movement of the line at the fisherman's end is necessary to effect a fairly small immediate movement at the other end of the line.

On the other hand, the leverage available to the fish through the pole is also considerable because of the length of the pole providing leverage that results in a relatively small fish being able to exert a considerable force on the hands and arms of a fisherman This leverage results in considerable fatigue in the fisherman merely from resisting the pull of the fish. Since the fisherman must also usually exert constant tension on a fish to avoid loss of such fish by displacement of the hook or snapping of the line, the leveraged force of the fish upon the fisherman is almost constant When it comes time to reel in a fish, a small fish will merely be reeled in by turning the reel, relying upon the leverage provided by the diameter of the reel versus the length of the reel handle. However, only relatively little power is available, since only the small muscles of the hand and forearm of the fisherman are available to turn the reel and the leverage provided by the handle is relatively small. It is customary, therefore, in reeling in large fish both to the shore and to a boat, to reel while gradually lowering the pole to relieve or offset the leverage available to the fish as well as to relieve possible excess tension on a light line and then, while temporarily ceasing actual reeling, to raise the tip of the pole, exerting a rearward force (with respect to the fisherman) or forward force (with respect to the fish) on the line with the arms, and to some extent, with the back muscles of the fisherman by leaning back. This serves to draw the fish toward the fisherman. The pole will then be slowly lowered while reeling in as fast as possible and then after the pole has been brought almost horizontal or to whatever angle is comfortable to the fisherman, again ceasing reeling and drawing or rotating the pole backward again with the action of the arms, and particularly the forearms as powered by the biceps muscles in the arms of the fisherman supported or backed up by the large muscles in the shoulders of the fisherman.

Thus, whether from the shore or from shipboard, when fighting or landing a fish, the same general pattern of pivoting the fishing rod backward while ceasing reeling and then rapidly reeling as the pole is gradually lowered is followed. Since larger fish can frequently be approached more closely and hooked, however, only from a boat, and a boat may at times not provide a very stable platform from which to work or fish, it is frequently found that a fishing chair is almost a necessity to effectively play a fish, although some fishermen still prefer to stand on deck as much as possible while playing a fish. In addition, the strength of most fisherman's arms is relatively insufficient to bring in a large fish, particularly over a long period of time on a light line, which light line is frequently felt to be more sporting. Consequently, various ways of using some of the larger muscles of the body, particularly of the legs as aids to or even replacements for arm and shoulder muscles, have been both sought and devised.

It has, therefore, become customary for a fisherman for large game fish to sit in a heavy chair at the stern or on the aft deck of a sport fishing boat where such fisherman is not only more comfortable, but more secure than he or she would otherwise be. Such chair is denoted either as the fishing chair or "fighting" chair and is usually pivotably mounted upon a pedestal. A conventional "fighting" chair has a back and a seat from which there extends a foot rest to enable the fisherman to brace himself or herself while straining backward against a struggling fish. Usually a rod holder is mounted in the front surface of the chair between the legs of the fisherman. The butt of the fishing rod can be rested in such rod holder which provides a pivot point from which the rod can be moved in an arc back and forth as a fish is reeled in or otherwise drawn closer to the boat. Occasionally dual rod holders are provided on both sides of the fighting chair for preliminary support of two fishing rods with line out. A conventional fighting chair is disclosed in U.S. Pat. No. 4,278,289 to Esposito. The rod holder may be a separate cylindrical container arranged to pivot back and forth while reeling in the fish, such movement provided to the rod being sometimes referred to as "pumping" the rod.

Fighting or reeling in a large game fish is a strenuous exercise as well as time consuming and it is not uncommon for fighting or playing a large fish on a light line to take from forth-five minutes to one-and-a-half hours and sometimes as much as five-to-eight hours or occasionally even more. During this entire period of time, the fisherman will be keeping tension in the line by pulling back on the pole in opposition to the fish. As explained above, the leverage of the pole is against the fisherman and in favor of the fish, although the fisherman has the advantage when quickness of response to movements of the fish is considered. Consequently, the playing of a large game fish places a great deal of tension in the arms and shoulders of the fisherman. The fish not only, as indicated above, has the advantage in leverage of the pole but is also, if anything, usually in better shape than the fisherman. In the nature of things, there are relatively fewer overweight, out of shape game fish in the ocean than fishermen in sport fishing boats upon the ocean. The arms and shoulders of the fisherman, in particular, therefore become quickly fatigued.

As a result, big game fishing is often a truly exhausting sport. Not surprisingly, there have been a number of suggestions for transferring some or all of the stress of pulling back on the pole from the arms to other parts of the body of the fisherman such as the large muscles of the legs which are relatively strong as a result of normal support of the weight of the fisherman's body. Fishing chairs have been devised, therefore, where the seat on the chair or else the entire chair can be moved back and forth by the force of the legs upon a foot rest or stop. Movement of the seat in this manner with the fisherman upon it serves to also move the rod and reel held by the fisherman or supported partially or even wholly by the rod holder at the same time applying considerable tension through the pole into the line. Such an arrangement is disclosed in U.S. Pat. No. 4,086,676 to Arruza. Other arrangements enable the legs of the fisherman to pivot the pole holder in a vertical plane by pushing on a foot rest or stop with the feet. A device of this nature is shown in U.S. Pat. No. 3,126,180 to Mandolare and also U.S. Pat. No. 3,851,916 to Quartullo. A further arrangement of this nature is also shown in U.S. Pat. No. 4,879,963 to Dionne which uses a narrow saddle seat which takes up less room than the conventional wide chair and incorporates a swinging foot rest mounted on the front of the seat or on the lower support sections of the seat. Pressure of the feet on the swinging or pivoting foot rest serve to move a cylindrical rod holder mounted on the opposite end of the foot rest and aid in moving a rod holder during playing a fish.

While prior devices for decreasing the fatigue of a fisherman by increasing the ease with which tension may be applied to the fishing line, particularly by use of the large muscles in the legs and the body, have experienced some success, none has been completely satisfactory. Consequently, there has been a need for an improved fishing chair which is not only less tiring to the fisherman, but more convenient in applying tension to the fishing line and which is compact and convenient to use both on large and small boats, as well as economical to produce.

OBJECTS OF THE INVENTION

With the foregoing in mind, a principle object of the present invention is to provide a sport fishing seat that enables a fisherman to minimize muscular action when landing large game fish.

It is another object of the invention to provide a sport fishing seat that fully utilizes the natural weight of the fisherman against the resistance of a fish.

It is a still further object of the invention to provide a sport fishing seat that applies tension to a fish at an increased upward angle.

It is a still further object of the invention to provide a sport fishing seat that effectively applies a continuous substantially constant force against a fish.

It is a still further object of the invention to provide a sport fishing seat that requires minimal deck space.

It is a still further object of the invention to provide a fishing seat which uses the weight of the body of the fisherman mediated by a substantially horizontally disposed lever arm to play a fish.

It is a still further object of the invention to provide a new method and apparatus for continuously tensioning a fishing line in sport fishing involving the application of the weight of the fisherman directly downwardly against a lever arm whereby the angle of a rod holder is varied to maintain tension in a fishing line.

It is a still further object of the invention to provide a method and apparatus for fishing wherein direct aid of gravity in tensioning a fishing line is provided.

It is a still further object of the invention to provide a fishing seat assembly in which the weight of the fisherman mediated by a lever arm is used to directly vary the angle of a rod holder with a considerable increase in leverage against the pull of a fish.

It is a still further object of the invention to provide a fishing seat assembly in which the vertical force of gravity may be converted by a suitable lever arrangement into a substantially horizontal force for playing a fish under precise control by the fisherman It is a still further object of the invention to provide a fishing seat assembly that couples a gravity mediated lever against a lever arranged to apply substantially horizontal force against a fish, the two levers arm being arranged to be within 35 to 55 degrees of each other.

It is a still further object of the invention to provide a sport fishing seat assembly in which the weight of almost any fisherman can directly overcome the strength of almost any fish.

It is a still further object of the invention to provide a sport fishing seat assembly which can be easily and simply used by any fisherman with a minimum of instruction and practice.

It is a still further object of the invention to provide a method of playing a fish using a specialized fishing chair apparatus that is efficient and effective in drawing large game fish to boat side.

Other objects and advantages of the invention will become evident from study of the appended drawings and accompanying description and explanation.

SUMMARY OF THE INVENTION

A new sport fishing seat assembly is provided by the present invention to overcome many of the afore-mentioned deficiencies in prior art fishing seats. A lever arm pivoted in an upright rotatable post or support preferably upon a pedestal accommodates a seating position for a fisherman at one end removed from the pivot point and a rod holder or support mounted upon the lever arm relatively close to and preferably below the pivot point designed to hold or clamp a fishing rod at an angle preferably of between about 35 and 55 degrees of the longitudinal axis of the lever arm. Preferably a saddle-type seat is provided on the lever arm at the seating position. The rod holding position is, in effect, on the very short end of the lever system and the fishermen's seat is on the long end of the lever system such that the weight of the fisherman is multiplied by several factors to counterbalance the tension of a fish on the line of a fishing pole held or secured at such rod holding position. Essentially, the apparatus of the invention functions in the general manner of a seesaw. The pivot point of the lever arm constitutes the fulcrum, while the fisherman's weight and the resistance of the fish constitute the respective forces at each end of the seesaw or lever system In practice, the fisherman sits on the seat at one end of the lever system, and in so doing, applies a constant force that counterbalances the force generated at the opposite end of the lever by the struggling fish. The fisherman can generate a constant pressure with minimal effort by merely resting on the seat. As the fish weakens, the weight of the fisherman gradually overtakes the tension from the fish, thus gradually lowering the fisherman closer to the deck. The fisherman can then push off the deck with his legs raising the lever arm and lowering the pole while reeling in any slack in the fishing line generated from the ascending motion of the lever arm. Since the seat for the fisherman is positioned on the long end of the lever and the rod holder is located or positioned on the short end of the lever, any given weight of the fisherman can overcome almost any size fish desired, even though the distance between the rod holder and the seat is, as a practical matter, limited by the length of the arms of the fisherman. It is preferred to use a saddle type seat on the lever for the fisherman so that the fisherman's legs are unimpeded in reaching for the deck or an optional foot rest and, as a result the fishing seat, takes up relatively little transverse room on the deck, enabling in many cases two fishing seats to be used where normally there might be room only for one. Since the rod holder can be positioned very close to the pivot point of the lever arm providing a very short leverage, the longer lever arm supporting the seat need only be a few feet in length or even less. Consequently, the seat and rod support assembly of the invention does not take up an excessive amount of deck space.

BRIEF DESCRIPTION OF THE DRAWINGS

FIG. 2 is an isometric view of the post and pedestal component of the sport fishing seat of the invention.

FIG. 3 is a side view, partially in section of the lever arm component of the invention including the seat and the rod holder positioned at opposite ends of the lever arm.

DESCRIPTION OF THE PREFERRED EMBODIMENTS

Figure 1:
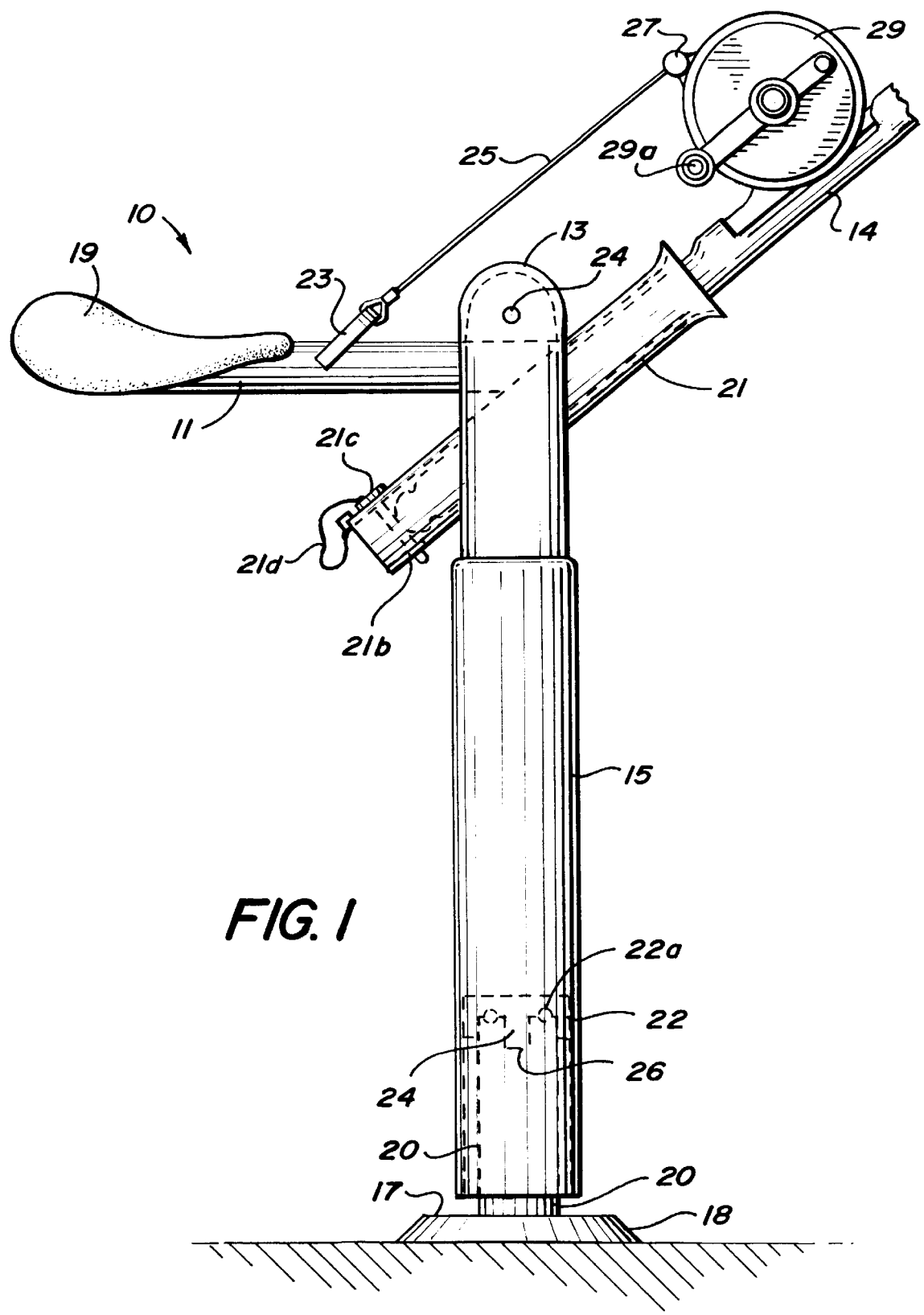
FIG. 1 is a diagrammatic side or elevational view partially in phantom of a sport fishing seat in accordance with the invention.

Fishing chairs for use on the after decks of charter and private sport fishing boats have been used for many years. Normally, the chair is pivoted on a vertical axis and provides a secure seat in which the fisherman may be seated for long periods of time while playing or reeling in large fish such as swordfish, blue marlin, sailfish, tuna or the like. Such so-called big game fish are frequently large and powerful fish which may severely tax the strength and endurance of a fisherman in attempting to bring the fish alongside a boat. Part of the difficulty in reeling in such fish is that the fishing pole itself, which is used basically for its leverage, enabling the fisherman to make sudden, fairly extensive moves of the fish line with only relatively small movements of his or her hands and arms, effects, with respect to the force applied by the fish, a reverse leverage that tends to amplify such force applied by the fish by the amount of leverage involved i.e. the length of the rod beyond the hands of the fisherman, with the result that a relatively small fish can often over a period of time severely tax the strength and endurance of a strong fisherman because of such reverse leverage. Nevertheless, the advantage provided by a fishing pole of being able to make quick and extensive movements of the line at the end of the pole with only small movements of the hands is relatively more important than the reverse leverage of the system that allows the fish's force to be multiplied and applied to the hands of a fisherman in a very tiring manner. Various ways of applying larger muscle systems of the body to execute at least the gross movements of the rod have been devised, particularly arrangements for allowing the relatively more powerful muscles of the legs to be applied to counter-balance the force of the fish so that the fish may be "played" out and finally brought to the boat and hoisted aboard. Some of these prior art devices have merely involved pivoting or support of the butt of the rod in a holder or the like which relieves the pivoting force of the rod from the wrists and transfers it to the larger arm muscles. Other arrangement have provided for horizontal movement of the fishing seat, by the force of the legs of the fisherman, drawing, or carrying a fishing rod holder along with the seat and thus tensioning the rod against the fishing line. In a second series of prior art devices, the legs of the fisherman are used through a suitable lever system to pivot the rod holder, substituting essentially at least in part for the force on the handle of the rod of the fisherman's hands to move the rod in a vertical arc with considerable less fatigue than otherwise. However, these prior arrangements still rely in one way or another upon the muscles of the fisherman to overcome the leveraged force advantage of the fish.

The present inventor has discovered that with a simple second leverage arrangement, the weight of the fisherman can be used to directly counterbalance the force of the fish on the line. By directly counter-balancing, it is meant that the force of gravity is applied essentially straight up and down rather than merely having the fisherman lean against the line. By directly counterbalancing the line by placing the seat on the long end of a lever and the pole holder on the short end of the same lever, as much counter leverage as desired can be applied to a fishing pole, essentially overcoming the negative leverage normally experienced as a result of the end of the pole being at some distance from the end that is held in the hands. Furthermore, the fish can be played with essentially only the expenditure of the energy necessary to extend the legs of the fisherman to partially remove the weight of the body from the seat end of the lever arm to allow the pole to be depressed or the even lesser energy to the legs in order to apply the full weight of the body to the seat to bring the pole to as upright a position as possible. Since the normal fisherman's legs are already adapted to supporting his or her own weight and even more because the tension of the fish itself will aid in lifting the seat and supporting the weight of the fisherman, the effort expended in the legs is well within the capability of almost all fisherman and usually much less than would be expended in directly opposing the tension of the fish on the line by the muscles of the legs.

In the preferred embodiments of the invention, the seat is preferably a saddle-type seat such as normally used on a bicycle. However, other types of seats can be used, including the more-or-less normal chair-type seat, which, however, may have to be modified in order to adapt it for extension of the legs of the user more vertically downwardly when the weight of the body is desired to be relieved wholly or partially from the lever system Bicycle-type seats are desirably relatively narrow, leaving desirable clearance about the fishing seat assembly particularly to the sides, and the seats are simple to use and install.

As seen in the drawings, FIG. 1 shows, partially in phantom, a preferred embodiment of the gravitationally counterbalanced fishing seat apparatus 10 of the invention having a lever arm 11 pivotally attached to the post head 13 of a support post 15. The post head 13 may be either unitary with the support post 15 in which case it constitutes merely the upper portion of the post 15 or it may constitute a separate section which could also be made adjustable with respect to the post to adjust for the height of the fisherman. A one-piece construction is simpler and more rigid, however.The support post 15 is rotatably attached to a commercially available pedestal or base 17. The lever arm 11 has a seat 19 at one end and a rod holder 21 welded beneath a pivot connection 24 substantially at the opposite end of the lever. A line or safety lanyard 25 is attached to a tie bar or loop 23 positioned on the lever arm 11 and engages a suitable connection 27 on the reel 29 of a fishing rod 14 slipped into the rod holder 21. Such lanyard or line 25 is conventionally attached to the reel 29 and serves to prevent the entire fishing rod from being pulled or jerked out of the rod holder 21 and/or the hands of the fisherman who, it should be understood, will be holding the portion of the rod beyond the rod holder as well as the lever, or handle 29a, of the reel 29. The pedestal or base 17 has a foot 18 having an upward extension 20 rotatably engaged with a cap plate 22 shown in phantom, welded at a predetermined level in the support post 15. A central extension 24a from the cap plate 22 extending downwardly into a centering orifice 26 in the top of the upward extension 20 maintains the post 15 centered on the pedestal 17 while a ball bearing raceway 22a, all shown diagrammatically in phantom, prevents binding between the upward extension 20 of the pedestal 17 and the cap plate 22 allowing the entire upper portion of the support post 15 including the posthead 13 to rotate.

Figure 1A:
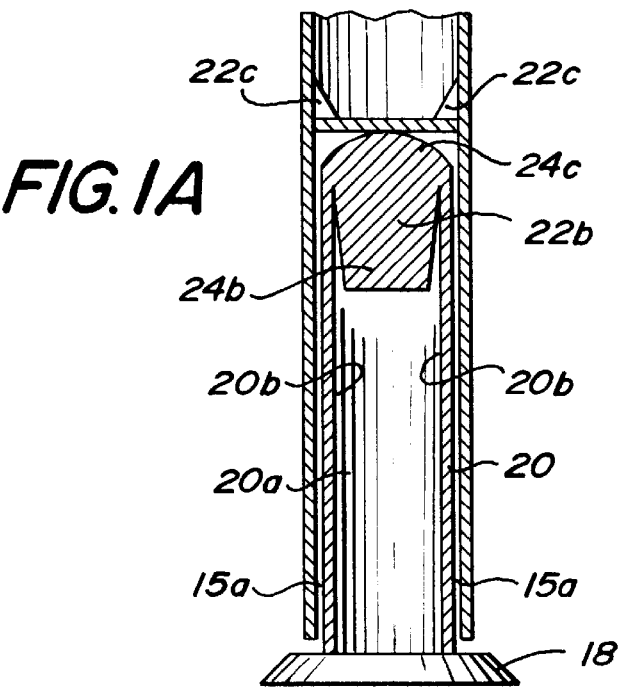
FIG. 1A is a cross section of an alternative and generally preferred pivoting arrangement for the post and pedestal arrangement of the invention.

A somewhat simpler, less corrosion sensitive and less likely to rotate too easily and, therefore, often preferable rotatable support arrangement is shown in partially broken away form in FIG. 1A. In FIG. 1A, the upward extension 20 from the foot 18 of the pedestal is formed of a sturdy hollow tube 20a the sidewalls 20b of which support a metal or other sturdy material cap 22b having a dependent section 24b which fits into the top of the tube 20a and a dome section 24c which supports the outer rotatable post 15 through the welded plate 22 in the same manner as shown in FIG. 1 Brackets 22c may brace the plate 22 within the post 15. Small ring-type bearing surfaces 15a may be provided between the outer surface of the post 20 and the inner surfaces of the hollow post 15 at the bottom to aid in keeping the post 15 centered upon the upward extension 20. The dome section 24c provides a limited central bearing surface upon which the post 15 is rotatably balanced allowing easy but not too free rotation of the outer post.

Figure 1B:
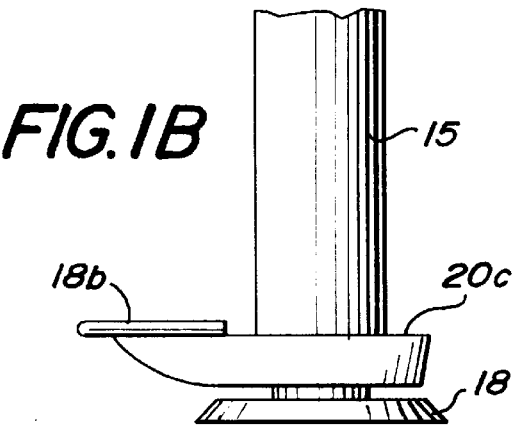
FIG. 1B is diagrammatic side elevation of a portion of the post and pedestal portion of the invention showing a footrest for the fisherman attached to the pedestal portion of the arrangement.

FIG. 1B shows a footrest 18a for the fisherman secured by a bracket arrangement 20c to the upward extension 20 from the base 18. Such footrest may be arranged to be stationary or to rotate with the post 15 depending upon which of the structures 20 or 15 it is clamped to.

FIG. 2 is an isometric view of the support post 15 and lower portion or foot 18 of pedestal 17. Fastenings 17a fasten foot 18 to the deck of the boat upon which the fishing chair of the invention is mounted. In this particular embodiment, the post head 13, which is shown integral with the post, has a space 31a and 31b for pivotally receiving the lever arm 11, shown in FIG. 1, therein. Although the space 31 is sufficiently large to allow the lower half of the rod holder 21 to rotate completely through, the lower end of such rod holder 21 cannot pass through the space 31b because the lower end of the rod holder preferably contacts the post directly beneath the space 31b. In effect, the angle of rotation for the rod is limited by the contact point between the bottom of the rod holder and the post, thereby preventing the rod holder 21 or rod 14 from rotating through the space. An aluminum tube, not shown, may be useful in encasing the lower half 35 of the post 15 to provide added support. Alternatively, the entire post may be formed of solid aluminum, stainless steel or some suitable strong structural plastic.

Figure 3A:
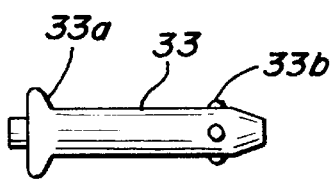
FIG. 3A shows a preferred type of clevis pin.

FIG. 3 is a side view of the lever arm 11 showing its general construction. The lever is essentially a one-piece unit having a seat 19 attached at one end, and a short pivot support 24 for receiving a clevis pin 33, shown in FIG. 2, at the opposite end. A preferred form of clevis pin is shown in FIG. 3A. Such pin 33 has an expanded head 33a at one end and spring biased detents 33b at the other. A cylindrical rod holder 21 is welded beneath the pivot support 24 of the lever arm 11 through which pivot support 24 is provided a pivot orifice 24a. A connection ring or bar 23 may also be attached to the lever arm 11 to secure the lanyard 25 shown in FIG. 1 to the lever arm. As will be seen, the lever arm 11 comprises essentially a lever assembly having a seat 19 at the long end and a rod holder 21 at the short end with a pivot point or opening 24a in between, but essentially as close to the rod holder as possible to take maximum advantage of the weight of the fisherman on the seat 19. There is little danger of the relative length of the leverage of the seat 19 being too much greater than that of the reel holder because the user will support as much weight as necessary on his or her legs. The rod holder, as shown, is preferably a hollow cylinder with an open lower end welded or otherwise secured more or less directly under the pivot support 24. The rod holder 21 may have a flared upper end 21a to facilitate insertion of the butt end of a fishing rod into the holder and has a series of pin openings 21b to accommodate a removable pin 21c, shown removed and on a short lanyard 21d, which can be inserted through the openings 21b of the cylindrical rod holder 21 to form an adjustable stop or bottom support for the rod. The normal cruciform groove in the bottom or butt end of the handle of the rod fits over the adjustable and removable pin 21c to keep the rod from rotating in the rod holder.

Figure 3B:
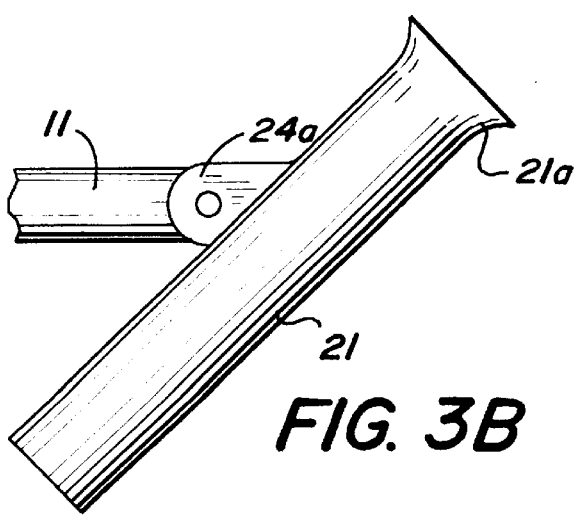
FIG. 3B is a partial side view of an alternative arrangement for the pivot pin opening in the lever arm of the apparatus of the invention.

FIG. 3B shows a partial view of a further embodiment of the lever arm 11 in which there is no separate pivot support section 24 and the pivot orifice 24a is positioned directly in the lever arm 11 itself.

Figure 4:
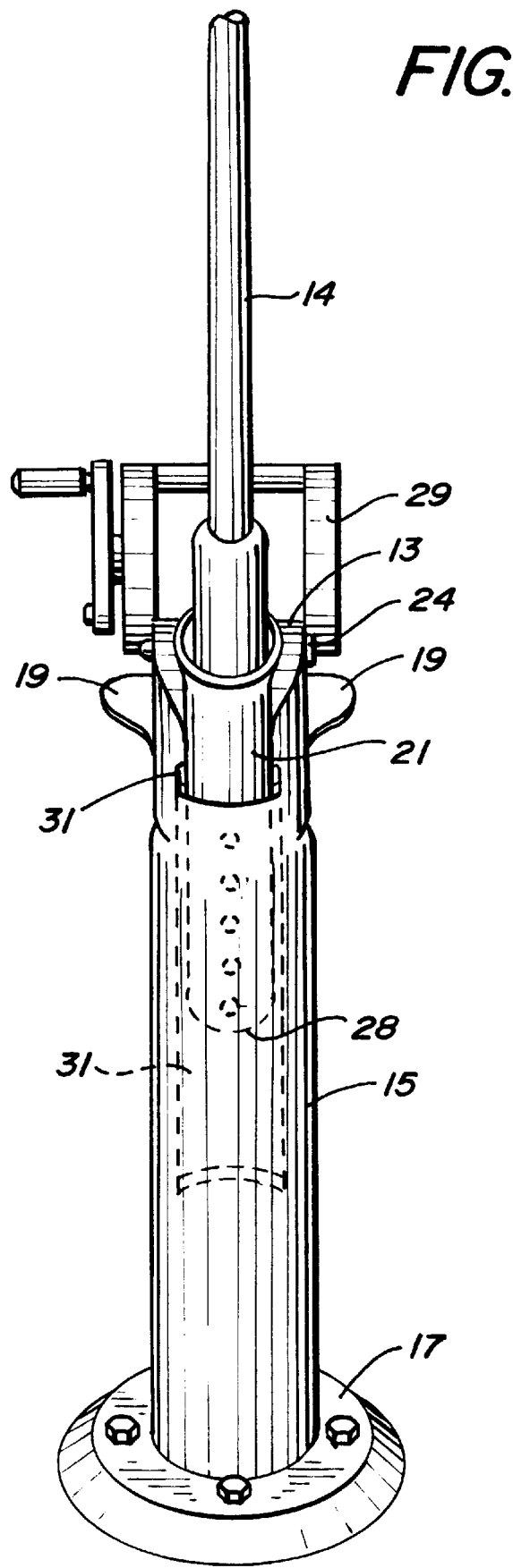
FIG. 4 is an isometric front view, partially in phantom of the assembly of the invention with a fishing rod positioned in the rod holder.
Figure 5:
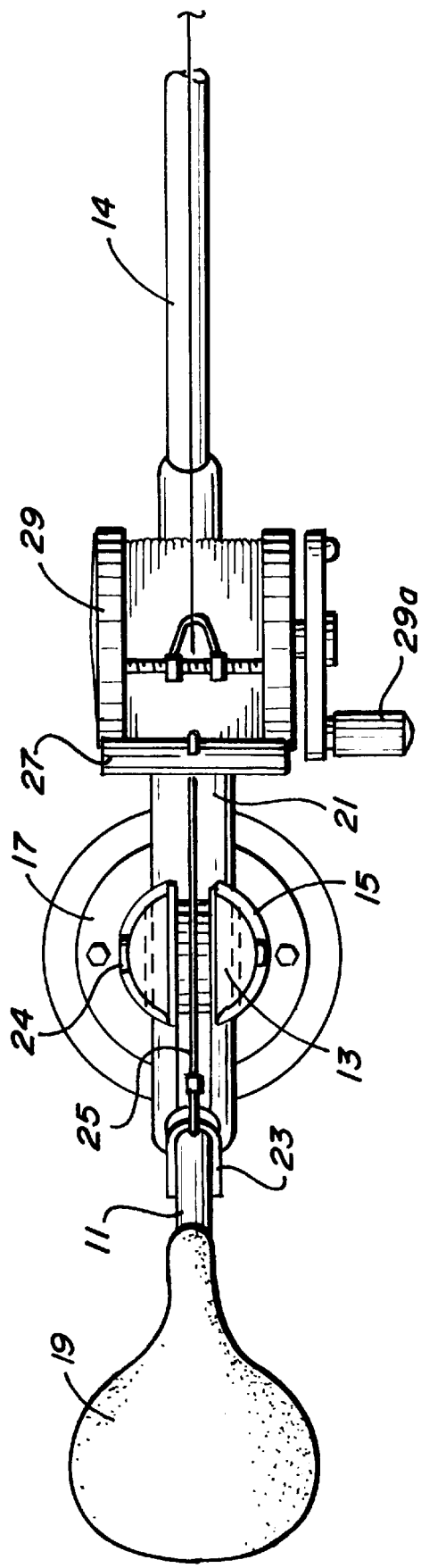
FIG. 5 is a top plan view of the device of the invention with a fishing rod in place in the rod holder and the rod depressed essentially as occurs at the end of a reeling cycle.

FIG. 4 shows a front view of the post 15 and pedestal 17 similar to that shown in FIG. 2 but also including the lever arm 11 which is obscured by the rod holder 21, all pivotally mounted in the post and with a fishing rod 14 inserted in the rod holder 21 attached to the lever arm 11. The space 31 within the clevis or posthead portion 13 of the post 15 is sufficiently large so as to allow the bottom portion 28 of the rod holder 21 to rotate completely through the space 31. However, the opposite side of the post 15 is not cut out to accommodate passage of the rod holder 21. In addition, the bottom portion 28 of the rod holder 21, is also preferably not short enough to rotate through the space. Thus, the lower end 28 of the rod holder 21 engages the post 15, if the holder is rotated almost vertically, thereby limiting the rotative angle of both the holder and the rod. FIG. 5 shows a top view of the seat and rod holder assembly of the invention showing essentially the same structures as shown in FIG. 4.

Figure 6:
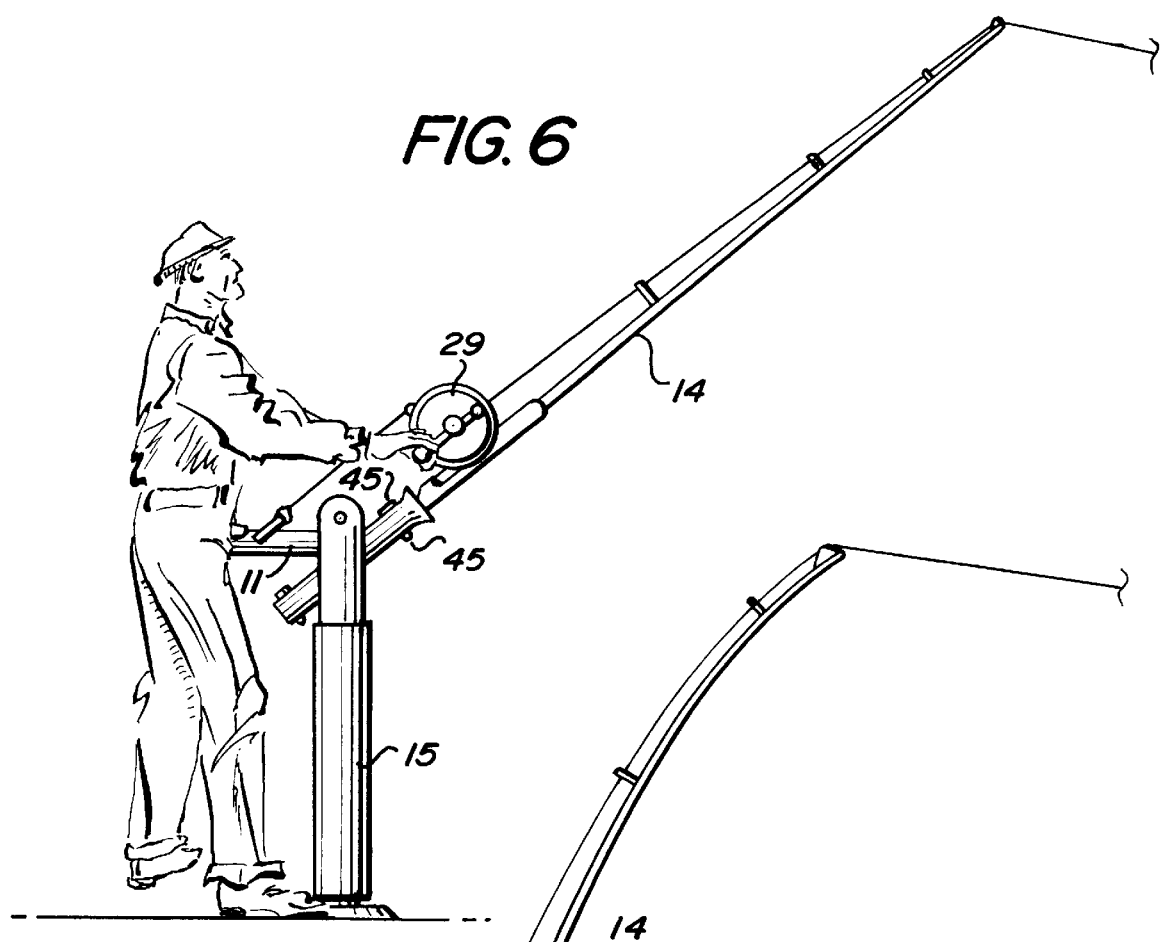
FIG. 6 is a side elevational view of the apparatus of the invention with a fisherman exerting his weight upon the seat end and the rod depressed essentially at the end of an excess line reeling cycle.
Figure 7:
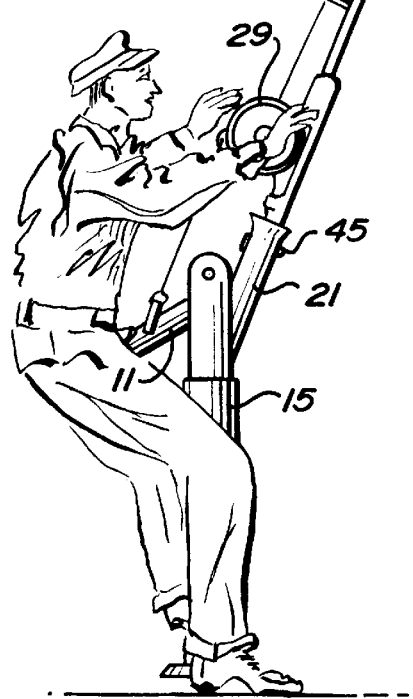
FIG. 7 is a side elevational view of the apparatus of the invention with a fisherman exerting his weight upon the seat end and the pole raised essentially at the end of a fish drawing-in cycle.

FIG. 6 and FIG. 7 illustrate the use of the sport fishing seat of the invention. While on the seat, the fisherman is mostly supported by his or her own feet which remain on the deck, or on the optional foot rest shown in FIG. 13, with knees bent. As shown in FIG. 6 however, hooking a large fish may depress the rod considerably, thus rotating the rod holder 21 clockwise as shown in the figure and causing the seat end of the lever arm 11 to elevate. The elevation tends to lift the fisherman, who now straightens his legs sufficiently to usually keep them on deck or upon the optional foot rest, but also allows the seat 19 to be lifted to relieve the tension on the line, thus causing the natural weight of the fisherman to work against the force exerted by the fish. More importantly, the downward force from the weight of the fisherman is enhanced because of the relatively long lever arm supporting the seat 19 compared to the very short lever arm of the rod holder. More typically, conventional means of reeling in fish employ a direct horizontal resistance wherein the fisherman applies an opposite vector force against that of the fish. The pivoted lever arm arrangement of the present invention, however, applies an increased upward angular pressure that affords the fisherman increased leverage against the fish. This prevents the fish from becoming further submerged and forces it to the surface more quickly by inducing fatigue, all while causing less stress on the fisherman.

A further pin 45 may be provided extending through a small orifice in the rod holder 21 and a similar orifice in the butt of the rod to lock the rod 14 in the holder 21. See FIG. 6. This pin 45 can substitute for the lanyard 25, but both may also be used for additional security. Other expedients for holding or locking the rod in position in the holder 21, or otherwise on the lever arm, may be used.

The method of using the apparatus of the invention is as follows. When the boat is first entering a fishing area, the line on the rod may be cast into the water with the lure or bait being used and the butt of the rod 14 placed in the usual boat rod holder until a fish strikes. As soon as a fish strikes, the rod will typically be moved to the pivoted rod holder 21 with the pin 21c supporting the rod at a desirable elevation and preferably the pin 45 or the lanyard 25 holding the rod in the holder. If desired, the rod may be initially placed in the seat rod holder, however. The weight of the seat or, if desired, an extra weight provided under the seat, will keep the seat end of the pivot arm 11 depressed and the rod erect. At any time the fisherman may mount the seat 19 and basically stand on the deck or on the optional foot rest with the seat between his legs. At this point if a fish strikes the line, the fisherman will be immediately in a position to jerk or move the line to set the hook in the fishes mouth and may then play the fish as described above, depressing the pole by extending his or her legs while reeling to shorten the line extending between the boat and the fish and then bending his or her legs to place either more or full weight on the seat to depress the seat and bring the rod upward at the same time placing tension on the line and pulling the fish toward the boat. The amount of tension placed upon the fish through the line is controlled by the amount of weight the fisherman places upon the seat 19 versus the amount he or she places on the deck or footrest through his or her legs and secondarily to a small extent by turning the handle of the reel. When the pole has been brought as upright as possible or as upright as the fisherman desires at the time, the fisherman will transfer some of his or her weight from the seat and support it on his or her legs. The procedure of placing the fisherman's weight on the seat to rotate the pole upwardly to pull in the fish and then transferring weight slowly from the seat to the fisherman's legs while allowing the seat to rise and the pole to be depressed, at the same time reeling in line to maintain continuous tension on the line, will be done repetitively as the fish is worked toward the boat. Continuous tension is maintained on the line at all times so the fish is given no chance to swim vigorously away, in which case it might snap the line when it reaches the end of any slack. Continuous tension also prevents the fish from resting and more quickly exhausts the fish so it may be brought to the boat in basically an exhausted condition in which it may be easily dispatched, brought on board undispatched, or the like.

Since the lever arm 11 is preferably weighted even when the fisherman is not resting his or her weight upon such seat, the line may initially be left unattended with the rod depressed. When a fish strikes the hook, the lever arm, in combination with tension provided by a ratcheted reel, will initially retain significant tension in the line until the fisherman assumes fishing position. Meanwhile, rotatable movement of the pole and seat, as well as noisy rotation of the reel, will alert the fisherman to the fish. Such initially applied tension thus provides a further advantage of the invention. In many cases, as noted above, the rod will initially be supported in a boat rod holder and noisy rotation of the reel or the like will alert the fisherman to the hooking of a fish.

The angle of the rod holder 21 with the lever arm 11 is preferably approximately 45 degrees. This allows a 45 degree downward angle of the lever arm to theoretically bring the rod to a ninety degree angle and a 45 degree upward angle of the lever arm to bring the rod holder and rod horizontal. However, as indicated above, it is preferable for the end of the rod holder and the end of the rod, if it protrudes from the end of the and rod holder in case the pin 21c is not used, to be stopped by the inside portion of the posthead 13 so that the rod and rod holder cannot rotate completely through the post-head with the pole pulled back beyond vertical or so far as the lever arm 11 can be depressed without impinging upon the deck of the boat. While a 45 degree angle of the rod holder 21 with the lever arm 11 has been found to be very satisfactory, the angle of the rod holder with the lever arm may be desirably between 40 to 50 degrees and less desirably between 35 to 55 degrees or even in the extreme, as much as 30 to 60 degrees.

As shown in the drawings, it is also desirable or preferable for the rod holder to be attached to the lever arm 11 below the actual pivot point. In effect the leveraged force applied to the fishing pole by the lever arm is determined by the relative distance between the seat and the top of the rod holder from the pivot point 24. Consequently, by positioning the rod holder directly under the pivot point so a portion of the holder is basically on both sides of the pivot point in relation to the lever arm, the portion of the leverage formed by the rod holder is minimized increasing the effective lever position of the seat 19 on the end of the lever arm 11 vis-a-vis the rod holder 21, of course, the length of the fishing pole itself also provides leverage against the seat lever arm so far as a fish is concerned and this is one reason big game fishing poles are often fairly short. However, the turning force applied by the rod holder to the end of the rod is much greater than any force that can be applied to the rod merely by the hands of the fisherman.

It is also possible, but not preferred, to attach the rod holder to the lever arm on either side of the pivot point of the lever. In either case the relative lever movement of the seat position over the lever movement of the rod holder will tend to be decreased assuming the length of the seat from the pivot area remains the same. In advanced versions of the invention, the lever movement of the seat can be increased by lengthening the lever arm to reposition the seat farther from the pivot point. For example, lever arm 11 may be made in the form of a telescoping arm that can be lengthened or shortened by releasing one or more set screws and pulling the telescoping portion of the arm out, after which the set screws or other securing means can be again tightened. Various designs of telescoping arrangements can be used. However, as a practical matter, the distance between the rod holder and the seat cannot be varied to any great extent because the reel of the rod must be a convenient distance from the seat appropriate to the length of the fisherman's arms. In addition, a fisherman with longer arms is usually heavier so that a longer lever arm is unlikely to be necessary in any event. It may be convenient to have an adjustable lever arm, however, in order to allow the fisherman to adjust the distance from the reel to the seat to his or her most comfortable arm position for reeling.

A further way of adjusting the relative leverage advantage of the fisherman over a fish is to increase the outer weight of the lever arm. For example, rather than relying completely upon the weight of the fisherman against the fish as leveraged by the seesaw arrangement of the lever arrangement of the invention, more or less weight can be provided upon the lever arm. For example, long narrow weights can be attached under the lever arm by screw means or the like. Such weights may be molded to the underside of the lever arm 11 and be fitted over screw threaded studs onto which a screw cap may be placed to maintain the weights in place. In advanced designs, the weights may be more massive toward the outer end of the arm where the weight serves to maintain the arm biased toward the deck of the boat. Less desirably circular weights similar to barbell weights can be depended from the bottom of the arm between the position of the seat and the pivot point out of the way of the fisherman's legs. In most cases, no additional weight will be required for normal sized fisherman, since with the normal apparatus of the invention a one hundred pound fisherman can easily play almost any normal sized game fish.

The apparatus of the invention can be constructed of aluminum, but a preferred medium of construction is stainless steel, particularly if such apparatus is to be used in a marine environment. The seat is preferably made in the form of a more or less standard bicycle seat mounted on top of the lever arm, but may also constitute a metal seat or a padded seat attached directly to the top of the lever arm somewhat like the longer seats found on snowmobiles and water ski boats. While stainless steel is a preferred material of construction, composite plastic material such as carbon fiber reinforced plastic can also be used for the structural portions of the apparatus.

The seat as indicated above, should be pivoted to the deck of the boat so it can be rotated to any angle with respect to the stern of the boat. A conventional fishing chair base can be used with internal bearings to facilitate quick and easy turning as shown in phantom in FIG. 1. Since ball bearings may be subject to corrosion if exposed to marine environments, however, and extreme ease of turning is not really necessary it is preferred to use an arrangement such as shown in FIG. 1A which will be found quite satisfactory.

The lever arm, which is preferably pivoted in a bifurcated pedestal head as shown and described, for example, in FIGS. 1 and 2, can also be journaled on a pivot extending from the side of the post or arranged, for example, to pivot on the top of the post, for example, on a thin support edge extending from the bottom of the lever arm and balanced in a guide slot or groove at the top of the post in a simulation of the mounting of a balanced seesaw. Such an arrangement is particularly effective for a heavy plastic structural arrangement.

The rod holder, while usually arranged with a single angle with respect to the lever arm can also be made adjustable as to angle with respect to the lever arm. For example, the rod holder may be made to be secured to the side of the lever arm or mounted on top of the lever arm and in such case, the angle of the rod holder can be varied depending upon the personal preferences of the fisherman or the captain of the boat upon which the fishing seat assembly is mounted. For example, a small fisherman with short legs may desire a different angle or may prefer to bring his pole to a different angle at any given position of the main lever arm.

The height of the post and/or pedestal can also be made variable so it can be adjusted for the height or length of legs of the fisherman. Alternatively, the height or position of the pivot in the pedestal head can be varied or made adjustable to accommodate various heights or length of the legs of the fisherman. More conveniently in many cases, a fisherman with short legs may merely stand upon a suitable platform or height-adjustable platform or optional footrest.

Rather than having a conventional rod holder into which the butt of a fishing rod can be slid and by which the rod can be angled, it is also possible to provide a clamping arrangement on the lever arm to clamp the rod to the lever arm so that as the lever arm moves the angle of the rod will be changed in the same manner as in the embodiments shown in the figures.

As will be recognized from the above enumeration of changes and variations that are possible in the apparatus of the invention, such invention can be constructed in a number of manners and designs and still operate in the basic manner of such invention. The essentials of the invention are basically that a horizontally pivoted lever arm be provided with an area or arrangement at one end upon which a fisherman may apply his or her weight while varying the total weight applied by contacting the deck of the boat upon which the lever arm is mounted or a footrest related to such deck with the fisherman's feet and that a pole holding or clamping device be mounted upon the lever arm nearer the pivot point of said lever arm than the weight applying area or portion of the arm. In this manner, the leverage of the lever arm activated by the weight of the fisherman is used to counteract the leverage normally exerted by a fish against the hands of a fisherman thus decreasing the strain and fatigue normally incident to playing a large fish from a boat. Thus, while a preferred embodiment of the invention is shown in the appended drawings and described in detail above, it will be understood that other less preferred embodiments of the invention with various elaborations as also described above can be used. While various fishing chairs have been used in the past, none so far as the present inventor is aware, has deliberately made use of an arrangement in which the weight of the fisherman's body directly counteracts the leverage which can be applied by a fish to the hands of a fisherman through the usual pole, nor an arrangement in which a fisherman may apply his weight directly against a fish when playing the fish during sport fishing. While other inventors have attempted to alleviate tiring of a fisherman by transferring the strain of playing a fish through the reverse leverage of a pole by applying larger muscles of the body to control of the movement of the pole, the present applicant has taken a new tack and instead of applying larger muscles to control of the pole, has instead arranged to apply the weight of the body itself against the leverage of a fish on a pole and in addition, uses the large muscles of the body merely to control the application of such weight.

It will be seen from the above that the present invention serves very effectively, not only to aid a fisherman in playing fish efficiently and reasonably quickly up to a boat, but also very efficiently to relieve fatigue and strain in the fisherman. The apparatus and method of using such apparatus is, furthermore, easy to master, interesting and fun to practice, and provides a fisherman both while using the apparatus to land a fish and thereafter with a considerable feeling of satisfaction and accomplishment because of the active part the fisherman plays in working the fish and the strategy involved in playing such fish into the boat. The active movement of the legs of the fisherman also is attractive to that minority of fishermen who prefer to stand while playing a fish where possible.

It should be understood that although the present invention has been described at some length and in considerable detail and with some particularity with regard to several possible embodiments in connection with the accompanying figures and description, all such description and showing is to be considered as illustrative only, and the invention is not intended to be narrowly interpreted in connection therewith or limited to any such particulars or embodiments, but should be interpreted broadly within the scope of the delineation of the invention set forth in the accompanying claims and, thereby to effectively encompass the intended scope of the invention.

I claim:

1. A sport fishing seat and rod support assembly comprising:
   (a) a support mounting,
   (b) a lever arm pivoted in a generally horizontal orientation upon the support mounting to provide an alternate up-and-down motion,
   (c) a first portion of said lever arm toward one end of said lever arm being arranged and constructed for contact with and at least partial support of the body weight of a fisherman, and
   (d) a fishing rod support means positioned upon a second portion of the lever arm closer to the pivot point of the lever arm upon the support mounting than the first portion of the lever arm and at an angle that will provide at least in part a general back and forth arcuate motion to the rod support means whereby the weight of the fisherman may be leveraged against the pull of a fish through a line against the end of a fishing rod in the rod support means.

2. A sport fishing seat and rod support assembly in a accordance with claim 1 wherein the first portion of the lever arm incorporates a seat means for contact with the fisherman.

3. A sport fishing seat and rod support assembly in accordance with claim 2 wherein the seat means comprises a saddle-type seat.

4. A sport fishing seat and rod support assembly in accordance with claim 1 wherein the fishing rod support means positioned upon the second portion of the lever arm comprises an elongated rod holder having interior dimensions to closely surround the lower portion of a fishing rod.

5. A sport fishing seat and rod support assembly in accordance the claim 4 wherein the first portion of the lever arm arranged and constructed for contact with and at least partial support of the body weight of the fisherman incorporates a seat.

6. A sport fishing seat and rod support assembly in accordance with claim 5 wherein the elongated rod holder is positioned at an angle of 30 to 60 degrees with respect to the longitudinal axis of the lever arm.

7. A sport fishing seat and rod support assembly in accordance with claim 6 wherein the elongated rod holder is positioned at an angle of 35 to 55 degrees with respect to the longitudinal axis of the lever arm.

8. A sport fishing seat and rod support assembly in accordance with claim 7 wherein the elongated rod holder is positioned at an angle of 40 to 50 degrees with respect to the longitudinal axis of the lever arm.

9. A sport fishing seat and rod support assembly in accordance with claim 8 wherein the support mounting is rotatable.

10. A sport fishing seat and rod support assembly in accordance with claim 7 wherein the elongated rod holder is positioned at an angle of 40 to 50 degrees to the longitudinal axis of the lever arm.

11. A sport fishing seat and rod support assembly in accordance with claim 6 wherein the elongated rod holder is positioned at an angle of 35 to 55 degrees to the longitudinal axis of the lever arm.

12. A sport fishing seat and rod support assembly in accordance with claim 1 wherein the fishing rod support means is positioned at least partially below the pivot point of the lever arm.

13. A sport fishing seat and rod support assembly in accordance with claim 12 wherein the lower portion of the rod support means is to one side of the pivot and the upper portion of the rod support means is to the other side of the pivot point.

14. A sport fishing seat and rod support assembly in accordance with claim 13 additionally incorporating means to temporarily secure a fishing rod within the rod holder.

15. A fishing seat comprising:
   (a) a rotatable pedestal,
   (b) an upwardly extended support on the pedestal,
   (c) a pivot support in the upper portion of the rotatable support,
   (d) an extended seat and fishing rod support pivoted upon the pivot support in a generally horizontal orientation,
   (e) a seat being positioned at a first position on the extended seat and fishing rod support, and
   (f) a fishing rod support positioned at a second position on the extended seat and fishing rod support at an angle that will provide at least in part a general back and forth arcuate motion to the fishing rod support,
   (g) the second position with the fishing rod support being nearer the pivot point of the extended seat and rod support than the first position of the seat.

16. A fishing seat in accordance with claim 15 wherein the fishing rod support is angled at from 35 to 55 degrees with respect to the longitudinal axis of the extended seat and rod support.

17. A fishing seat in accordance with claim 16 wherein the rod support is angled at from 40 to 50 degrees with respect to the longitudinal axis of the extended seat and rod support.

18. A method of fishing using a pivotally mounted generally horizontally extended seat and rod support having a seat at one end and a fishing rod holder toward the middle comprising:
   (a) straddling the seat on the extended seat and rod support while partially supporting the weight of the body on a support surface attached to a boat upon which the pivotally mounted extended seat and rod support is pivotally supported by one's legs while a fishing rod is supported in the rod holder,
   (b) after hooking a fish, placing additional body weight on the seat to move the seat downwardly and the rod upwardly and, because of the angle of the rod, backwardly, thereby pulling the fish toward the boat,
   (c) relieving some of the weight of the body from the seat to the support surface with the legs allowing the seat to gradually move upwardly and the pole downwardly while reeling in line,
   (d) again placing additional weight on the seat to force the seat downwardly and the pole upwardly and backwardly in an arc while ceasing reeling, and
   (e) repeating steps (b) through (d) until the fish is brought close to the boat.

19. A method of fishing in accordance with claim 18 wherein the pivotally mounted extended seat and rod support are left unattended initially after casting out the line until movement of the extended seat and rod support is noted upon hooking of a fish.

20. A method of fishing in accordance with claim 18 wherein the fishing rod is initially supported in a support attached to the boat separate from the extended seat and rod support until a fish is noted on the line and then transferring the rod to the pivotally mounted extended seat and rod support.

21. A sport fishing apparatus for use on a sport fishing boat which allows a fisherman to apply force to a hooked fish through a fishing rod by application of at least a portion of the weight of the fisherman to a portion of the apparatus comprising:
   (a) a lever means pivoted in a generally horizontal orientation between opposite ends of said lever means to a mounting support adapted for attachment to a sport fishing boat adjacent the upper surface of said boat,
   (b) said lever means having a body contact portion especially adapted for receipt of at least a portion of the body weight of the fisherman through contact with the fisherman's body at a position on one side of the pivot point of the lever means with the mounting support, and
   (c) a fishing rod holding means supported at a position on the other side of the pivot of the lever means upon the support mounting from the body contact portion of the lever means with an angle which provides an arcuate back and forth motion for the rod holding means.

22. A sport fishing apparatus in accordance with claim 21 wherein the body contact portion of the lever means is in the form of a seat.

23. A sport fishing apparatus in accordance with claim 22 wherein the seat is a saddle-type seat.

24. A sport fishing apparatus in accordance with claim 23 wherein the fishing rod holding means is an elongated rod holder having interior dimensions to closely surround the handle of a fishing rod.

25. A sport fishing apparatus in accordance with claim 24 wherein the elongated rod holder is positioned at an angle of 30 to 60 degrees of the longitudinal axis of the lever means.

26. A sport fishing apparatus in accordance with claim 25 wherein the elongated rod holder is positioned at an angle of 35 to 55 degrees of the longitudinal axis of the lever means.

27. A sport fishing apparatus in accordance with claim 26 wherein the elongated rod holder is positioned substantially below the pivot point of the lever arm.

28. A sport fishing apparatus in accordance with claim 27 wherein the distance from the pivot point to the body contact portion of the lever means is greater than the distance from the pivot point to the rod holder.

29. A sport fishing seat and rod support assembly comprising:
   (a) a support mounting,
   (b) a lever arm pivoted upon the support mounting,
   (c) a first portion toward one end of the lever arm for contact with and at least partial support of the body weight of a fisherman, and
   (d) a fishing rod support means positioned at a second portion of the lever arm closer to the pivot point of the lever arm upon the support mounting than the first portion of the lever arm for contact with a fisherman,
   (e) wherein the elongated rod holder is positioned at an angle of 30 to 60 degrees to the longitudinal axis of the lever arm.

30. A sport fishing seat and rod support assembly comprising:
   (a) a support mounting,
   (b) a lever arm pivoted upon the support mounting, (c) a first portion toward one end of the lever arm for contact with and at least partial support of the body weight of a fisherman, and (d) a fishing rod support means positioned at a second portion of the lever arm closer to the pivot point of the lever arm upon the support mounting than the first portion of the lever arm for contact with a fisherman, (e) wherein the fishing rod support means is positioned substantially below the pivot point of the lever arm, and (f) the lower portion of the rod support means is to one side of the pivot with respect to the lever arm and the upper portion of the rod support means is to the other side of the pivot point.

31. A sport fishing seat and rod support assembly in accordance with claim 30 additionally incorporating means to secure a fishing rod within the rod holder.

32. A fishing seat comprising:

(a) a rotatable pedestal, (b) an upwardly extended support on the pedestal, (c) a pivot support in the upper portion of the rotatable support, (d) an extended seat and rod support pivoted upon the pivot support, (e) a seat being positioned at a first position on the extended seat and rod support, and (f) a rod support positioned at a second position on the extended seat and rod support, (g) the second position being nearer the pivot point of the extended seat and rod support than the first position, (h) wherein the rod support is angled at from 35 to 55 degrees to the longitudinal axis of the extended seat and rod support.

33. A fishing seat in accordance with claim 32 wherein the rod support is angled at from 40 to 50 degrees to the longitudinal axis of the extended seat and rod support.

* * * * *